United States Patent

[11] 3,557,816

| [72] | Inventor | Donald A. Small<br>Castine, Maine |
|---|---|---|
| [21] | Appl. No. | 778,430 |
| [22] | Filed | Nov. 25, 1968 |
| [45] | Patented | Jan. 26, 1971 |
| [73] | Assignee | Corning Glass Works<br>Corning, N.Y.<br>a corporation of New York |

[54] TEMPERATURE SENSITIVE FLUIDIC DEVICE
18 Claims, 10 Drawing Figs.

| [52] | U.S. Cl. | 137/81.5 |
|---|---|---|
| [51] | Int. Cl. | F15c 3/08 |
| [50] | Field of Search | 137/81.5 |

[56] References Cited
UNITED STATES PATENTS

| 3,266,511 | 8/1966 | Turick | 137/81.5 |
| 3,279,531 | 10/1966 | Bowles | 137/81.5UX |
| 3,417,813 | 12/1968 | Perry | 137/81.5X |
| 3,426,782 | 2/1969 | Thorburn | 137/81.5 |

*Primary Examiner*—Samuel Scott
*Attorneys*—Clarence R. Patty, Jr. and Walter S. Zebrowski

ABSTRACT: A sensing device for the direct conversion of analogue temperature information to fluidic analogue or digital pressure information. A thermally deformable element is disposed so as to apportion a fluid stream, issuing from a nozzle into an interaction region, into one or more fluid outlet passages as a function of the temperature sensed by the element. The outlet fluid pressure is thereby varied as a function of temperature, which temperature is generated by the fluid, a medium being tested by the element, or an electrical current flowing in a resistance path in thermal contact with the element.

PATENTED JAN 26 1971  3,557,816

INVENTOR.
Donald A. Small
BY Walter S. Zebrowski
ATTORNEY 3,557,816

TEMPERATURE SENSITIVE FLUIDIC DEVICE

BACKGROUND OF THE INVENTION

The development of fluidic logic circuitry for analogue computation and industrial process control has led to the need for a fluidic component having the capability of providing fluid pressure information corresponding to the temperature of a test medium. Such a device would provide temperature information in an energy form directly utilizable by fluidic logic for the solution of temperature dependent relationships.

In the prior art, temperature information has ordinarily been provided in the form of corresponding electrical information by means of thermocouples, strain gauges, and the like. These devices find application in electrical analogue computation and process control but are not useful in pure fluid logic systems since they do not provide temperature information in fluid form. Where temperature information has been used in fluidic systems in the past, a kind of hybrid logic involving both fluidic and electrical instrumentation has been required.

SUMMARY OF THE INVENTION

It is, therefore, an object of the instant invention to provide a temperature sensitive fluidic pressure transducer having the ability to convert fluid thermal energy to fluid pressure information.

It is a further object of the instant invention to provide a pure fluid device for sensing temperature and thereby eliminate the necessity for converting temperature information to electrical energy.

Briefly, in accordance with the instant invention, there is provided a fluidic pressure transducer having a power nozzle for issuing a stream of fluid into an interaction region. At least one outlet passage located downstream of the interaction region is provided for receiving the stream. A thermally deformable member is disposed in interacting relationship with the stream for affecting the pressure of the fluid in the outlet passage as a function of the fluid temperature.

Additional objects, features, and advantages of the instant invention will become apparent to those skilled in the art from the following detailed description and attached drawings on which, by way of example, only the preferred embodiments of the instant invention are illustrated.

DETAILED DESCRIPTION OF THE PREFERRED EMBODIMENTS

Figure 1:
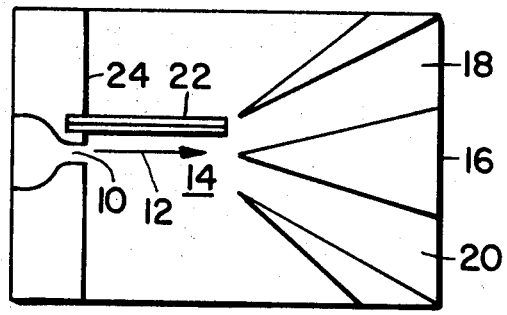
FIG. 1 is a plan view of a fluidic pressure transducer illustrating one embodiment of the instant invention.
Figure 2:
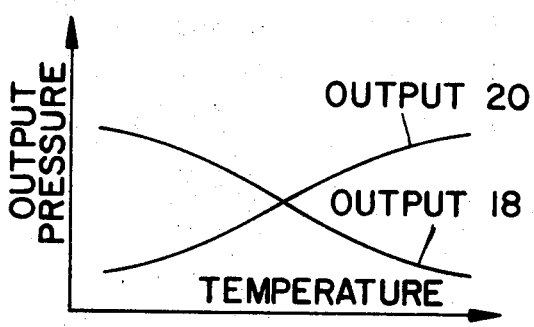
FIG. 2 is a graphical illustration of the typical output fluid pressure response of the transducer of FIG. 1 to fluid temperature.

Referring to FIG. 1 there is shown a nozzle 10 issuing a stream 12 of fluid into an interaction chamber or region 14. A wedge-shaped flow divider 16 is located downstream of the region 14 to divide the stream 12 between two outlet passages 18 and 20. A suitable thermally deformable element 22 affixed at one end thereof to one of the nozzle defining walls 24 projects into the region 14 along one side of the flow centerline of the nozzle 10. The element 22, being of a type well-known in the art, can be constructed of two dissimilar materials, such as metals, glasses, or the like, each having different coefficients of thermal expansion. At a predetermined temperature, as determined in a familiar manner by the designer for a particular application, the element 22 is substantially straight and the fluid stream 12 is divided evenly between the passages 18 and 20. However, as the temperature of the stream 12 increases, the element 22 deforms so as to deflect stream 12 and apportion it between passage 18 and passage 20 as a function of the fluid temperature. On the other hand element 22 forms an attachment wall for the stream 12 as it traverses the region 14 and, thus, as the temperature of the stream 12 decreases below the predetermined value, the element 22 deforms so as to displace increasing proportions of the stream 12 into the passage 18 and away from the passage 20. Referring to FIG. 2 the typical output pressure response of this device to fluid temperature changes is graphically illustrated.

Figure 3:
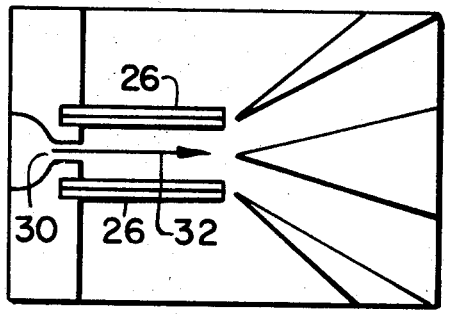

Referring to FIG. 3 there is shown a device similar to the one shown in FIG. 1 except that a pair of thermally deformable elements 26 are disposed in an interaction region 28. The elements 26 are positioned on both sides of the flow centerline of the nozzle 30 and form a pair of attachment walls for a fluid stream 32. The elements 26 are substantially identical in their respective thermal expansion properties and are disposed such that they both deform in the same direction for a given direction of temperature change. The use of two such elements 26 instead of only one as in FIG. 1 serves to minimize free jet losses and improve the pressure recovery of the device.

Figure 4:
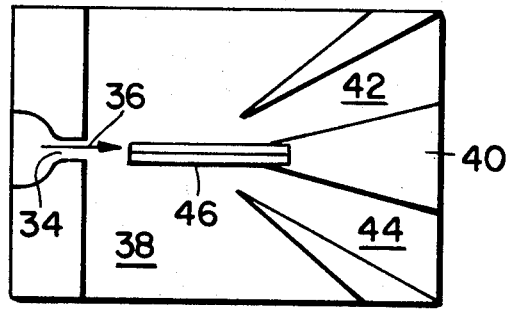
FIGS. 3 through 8 are plan views of pressure transducers illustrating various alternative embodiments of the instant invention.

Referring to FIG. 4 there is shown a nozzle 34 for issuing a fluid stream 36 into an interaction region 38 and a wedge-shaped flow divider 40 separating a pair of outlet passages 42 and 44. A thermally deformable element 46 is affixed at one end thereof to the vertex of the divider 40 and projects into the region 38 along the flow centerline of the nozzle 34. A change in the temperature of the stream 36 from a predetermined temperature at which the element 46 is substantially straight, causes the element 46 to deform, thus opening wider the entrance of one of the passages 42 and 44 and closing the other as a function of temperature. The fluid pressures in the passages 42 and 44 vary with fluid temperature change accordingly.

Figure 5:
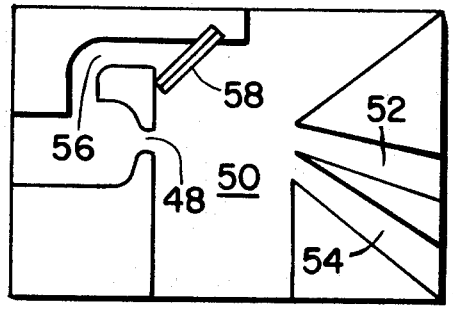

Referring to FIG. 5 there is shown a nozzle 48 for issuing a power stream of fluid into an interaction region 50 in the general direction of a pair of outlet passages 52 and 54. A control passage 56 is connected to receive a portion of the fluid upstream of the nozzle 48 and vent the same into the region 50. Across the downstream end of the passage 56 there is located a thermally deformable element 58 which is adapted to open the downstream end of the passage 56 progressively as the temperature of the fluid increases above a predetermined value. When the fluid temperature is below the predetermined value the passage 56 is effectively closed off from the region 50 by the element 58 and substantially all of the fluid issuing from the nozzle 48 enters the outlet passage 52. Consequently, at low temperatures the fluid pressure in the passage 52 is high compared with that in the passage 54. However, as the fluid temperature increases the element 58 opens the downstream end of the passage 56 and directs a fluid control stream into the region 50 against the fluid power stream issuing from the nozzle 48. The power stream is thus deflected by the control stream away from the passage 52 and toward the passage 54 in a progressive manner as the fluid temperature increases beyond the predetermined value. Accordingly, the pressure of the fluid in the passage 54 increases and that in the passage 52 decreases as the fluid temperature increases. Similarly, the fluid pressure in the passage 52 increases and the fluid pressure in the passage 54 decreases as the fluid temperature decreases on the high side of the predetermined temperature.

Figure 6:
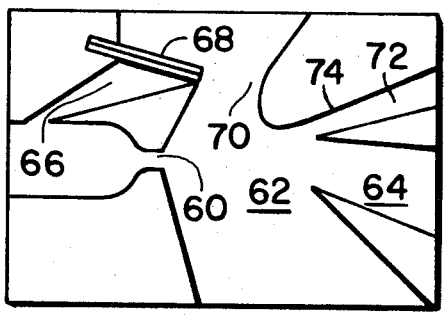

Referring to FIG. 6 there is shown a nozzle 60 for issuing a power stream into an interaction region 62 toward an outlet passage 64. A control passage 66 is connected to receive a portion of the fluid upstream of the nozzle 60 and vent the same through the region 62 and out the side of the device in a direction away from the power stream. At a predetermined temperature and below a thermally deformable element 68 seals the downstream end of the passage 66. In this condition the power stream issuing from the nozzle 60 is directed toward and received in the outlet passage 64. However, as the temperature increases above the predetermined value, the element 68 progressively opens the downstream end of the passage 66 to vent the fluid therein from the transducer. As will readily be appreciated by those skilled in the art, venting of the fluid from the passage 66 produces a low pressure region in channel 70. Since the channel 70 communicates between the region 62 and the downstream end of the passage 66, the low pressure produced therein causes the power stream to be deflected toward an outlet passage 72. A wall 74 is positioned such that it aids in guiding the stream toward the passage 72 at sufficiently high temperatures. Accordingly, the element 68 operates to displace the power stream away from the passage 64 and toward the passage 72 as a function of increasing fluid temperature. As the fluid temperature is decreased while on the high side of the predetermined temperature, the element 68 produces the opposite effect.

Figure 7:
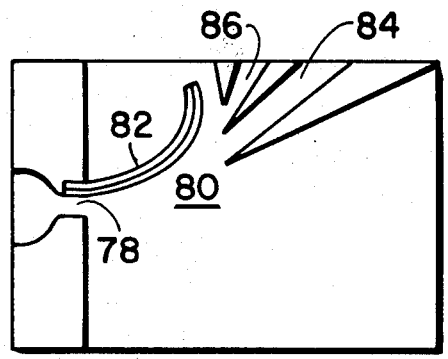
Figure 8:
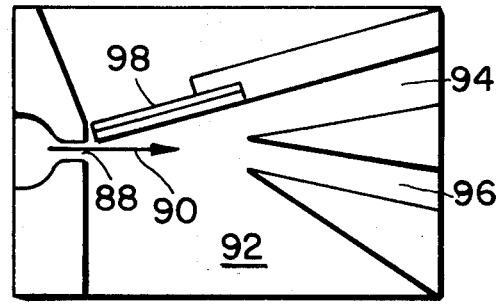
Figure 9:
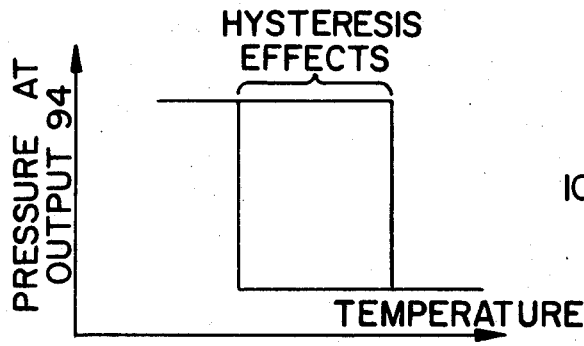
FIG. 9 is a graphical representation of the typical output fluid pressure response of the transducer shown in FIG. 8 to fluid temperature.

Referring to FIG. 7 there is shown a nozzle 78 for issuing a fluid stream into an interaction region 80. A curved thermally deformable element 82 forms an attachment wall for the fluid stream, not shown, and directs it along a curved path toward a pair of outlet passages 84 and 86. At low temperatures, below a predetermined value, the curvature of the element 82 is relatively gradual such that all or a large portion of the stream will depart tangentially from the element 82 into the passage 86. Thus, at these low temperatures the fluid pressure in the passage 86 is higher than is the fluid pressure in the passage 84. However, as the fluid temperature increases the element 82 deforms to a smaller radius of curvature thus decreasing the departure angle of the power stream, not shown, from the flow centerline of the nozzle 78. Accordingly, the pressure in the passage 86 rises and the pressure in the passage 84 decreases progressively with increasing fluid temperature while, for decreasing temperatures, the opposite reaction occurs. It should be noted that as the radius of curvature decreases the rate of curvature of the element 82 becomes greater causing the power stream to depart tangentially from the element 82 at a progressively smaller departure angle with respect to the centerline of the nozzle 78. The various devices previously explained are analogue devices each of which produce a progressive or continuous pressure change as a function of the temperature change sensed by the thermally deformable element. Referring to FIG. 8 there is shown a device having a digital fluid pressure output signal. A nozzle 88 directs a fluid stream 90 into an interaction region 92 toward a pair of outlet passages 94 and 96. A thermally deformable element 98 is disposed in the region 92 so as to form an attachment wall at low fluid temperatures thus displacing the stream 90 into the passage 94. This attachment wall, known as the Coanda effect, is familiar to those having knowledge of well known fluidic wall attachment devices such as flip-flops, and the like. As the temperature of the fluid increases the free end of the element 98 deforms away from the nozzle 88. As the fluid temperature is increased to a predetermined value, the element 98 becomes sufficiently deformed to detach the stream 90 therefrom at which point the stream 90 is directed along the centerline of the nozzle 88 into the passage 96. Thus the digital device of the instant example functions as a thermally sensitive switch or flip-flop device, the output state of which depends on whether the fluid temperature is above or below a predetermined value. FIG. 9 illustrates, in general, the output characteristic of the device of the instant example showing the well-known hysteresis effects which characterized such digital devices.

Figure 10:
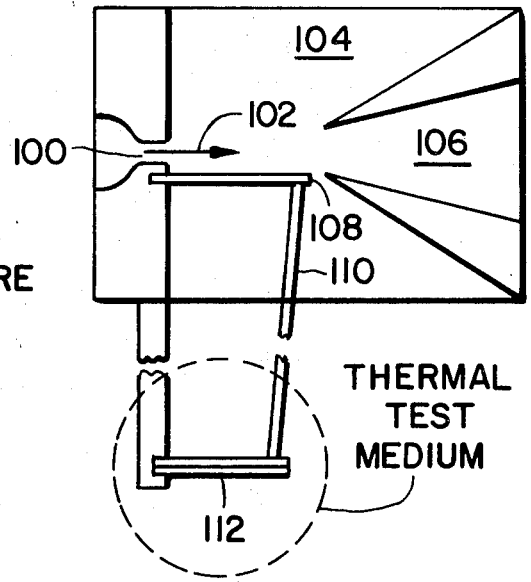
FIG. 10 is a plan view of a pressure transducer illustrating another embodiment of the instant invention.

Referring to FIG. 10 there is shown, in another example of the instant invention, a nozzle 100 for issuing a fluid stream 102 into an interaction region 104. The flow centerline of the nozzle 100 is in line with the entrance to an outlet passage 106. A flexible member 108, such as a thin metallic strip, is attached at one end thereof to one of the defining walls of the nozzle 100 and projects into the region 104 generally along the flow line of the stream 102. At the free end of the member 108, a rigid wire, rod, or other suitable mechanical linkage 110 is attached which connects at the other end thereof to the free end of a thermally deformable element 112. An additional feature of this embodiment is provided due to the location of the element 112 in a thermal test medium which is isolated from the stream 102. Because the element 112 is not in contact with the stream 102, it is practical to use this device in the measurement of the temperature of environments contaminated with dirt, gases, and particles which could not be tolerated in the various fluid conducting passages of the device itself. Also, since only the element 112 need be heated, without the necessity of heating the entire quantity of fluid passing through the device to produce the desired pressure response, this device can readily be designed to provide a rapid response to temperature change. Further, since none of the fluid-containing parts of this transducer need be subjected to the temperature of the test medium, the need for refractory materials for construction of the instant device is not required. In this example it is only necessary that the material comprising the flexible member 108 be able to withstand the maximum flexure applied thereto by the linkage 110 as a result of deformations of the element 112, without exceeding the elastic limit thereof.

In general it should be noted that the well-known bourdon tube can be utilized in any of the preceding examples in place of the thermally deformable element described therein. Such a tube is sealed in an air tight manner to enclose a thermally expandable gas therein. As the temperature of the fluid to which the tube is subjected is increased or decreased, the gas pressure within the sealed tube increases or decreases correspondingly, causing a deformation in the tube. Such a deformation can be utilized to directionally displace or apportion a fluid stream in the same manner as obtained with the bimetallic element, shown for illustrative purposes only, in the foregoing examples. Note too, that the thermally deformable elements previously described can be turned over so as to deform in the opposite direction with a given temperature change from the direction as indicated in the foregoing examples to reverse the output pressure characteristics of the devices as a function of temperature.

The device of the instant invention also can be adapted to provide a fluid pressure response to temperature change resulting from heating of the thermally deformable elements with an electrical current. This can be provided by affixing a coil or length of resistance wire either directly to, or otherwise in thermal contact with the thermally deformable element or elements of the devices. An electrical potential applied to the resistance wire in any well-known manner forces current to flow through the wire which in turn heats the thermally deformable element in the same manner as is accomplished by the fluid stream in the previous examples.

Although the instant invention has been described with respect to specific details of certain embodiments thereof, it is not intended that such details be limitations on the instant invention except insofar as set forth in the following claims.

I claim:

1. A temperature sensitive fluidic device comprising:
    a power nozzle for issuing a stream of fluid into an interaction region;
    at least one outlet passage located downstream of said region for receiving said stream; and
    thermally deformable means disposed in a position offset from and noncoincident with the centerline of said nozzle and in an interacting relationship with said stream for affecting the pressure of said fluid in said passage as a function of temperature sensed by said deformable means.

2. The device of claim 1 wherein said thermally deformable means comprises at least one element selected from the group consisting of a bimetallic strip the metallic components of which have different thermal expansion coefficients, and a bourdon tube.

3. A temperature sensitive fluidic device comprising:

a power nozzle for issuing a stream of fluid into an interaction region;

a control passage connected to receive a portion of said fluid upstream of said nozzle and thereafter discharge said portion into said region;

a thermally deformable element located across the downstream end of said control passage for controlling the discharge of said portion by means of which said stream is deflected as a function of said fluid temperature; and a flow splitting member located downstream of said region for dividing said stream between at least two outlet passages.

4. The device of claim 3 wherein said thermally deformable element comprises an element selected from the group consisting of a bimetallic strip the metallic components of which have different thermal expansion coefficients, and a bourdon tube.

5. A temperature sensitive fluidic device comprising:

a power nozzle for issuing a stream of fluid into an interaction region;

a control passage connected to receive a portion of said fluid upstream of said nozzle and thereafter discharge said portion through a vent, said vent communicating with said region;

a first outlet passage located downstream of said region along the centerline of said nozzle for receiving at least a portion of said fluid when the temperature of said fluid is less than a predetermined value;

a second outlet passage located downstream of said region offset from the centerline of said nozzle for receiving at least a portion of said stream when the temperature of said fluid is at least equal to said predetermined value; and a thermally deformable element disposed in said region across the downstream end of said control passage for controlling the discharge of said fluid through said vent as a function of temperature, said fluid discharge causing a low pressure in said region sufficient to deflect at least a portion of said stream from said first outlet passage to said second outlet passage when at a temperature of at least said predetermined value.

6. The device of claim 5 wherein said thermally deformable element comprises an element selected from the group consisting of a bimetallic strip the metallic components of which have different thermal expansion coefficients, and a bourdon tube.

7. A temperature sensitive fluidic device for analogue-to-digital signal conversion comprising:

a power nozzle for issuing a stream of fluid into an interaction region;

a first outlet passage located downstream of said region with at least the entrance to which being along the centerline of said nozzle for receiving said stream when the temperature of said fluid is at least equal to a predetermined value;

a second outlet passage located downstream of said region offset from the centerline of said nozzle for receiving said stream when the temperature of said fluid is less than said value; and a thermally deformable element disposed in said region in a position offset from and noncoincident with the centerline of said nozzle, and forming an attachment wall for said stream to deflect said stream into said second passage when the temperature of said fluid is less than said value, said element deforming sufficiently to release said stream from attachment thereto when the temperature of said fluid is at least equal to said predetermined value.

8. The device of claim 7 wherein said thermally deformable element comprises an element selected from the group consisting of a bimetallic strip the metallic components of which have different thermal expansion coefficients, and a bourdon tube.

9. A temperature sensitive fluidic device comprising:

a power nozzle for issuing a stream of fluid into an interaction region;

an arcuated thermally deformable element disposed in said region and forming a curved attachment wall for said stream to deflect said stream as a function of the temperature sensed by said element; and means defining at least two outlet passages located downstream of said region, said passages being in receiving relation to different departure angles of said stream from said element, said departure angles being defined by a line tangent to said element at the point of departure of said stream therefrom, and the flow centerline of said nozzle.

10. The device of claim 9 wherein said thermally deformable element comprises an element selected from the group consisting of a bimetallic strip the metallic components of which have different thermal expansion coefficients, and a bourdon tube.

11. A temperature sensitive fluidic device comprising:

a power nozzle for issuing a stream of fluid into an interaction region;

two outlet passages located downstream of said region for receiving said stream, said passages being separated from each other by a wedge-shaped flow divider, the apex of said divider being substantially on the centerline of said nozzle for dividing said stream between said two passages; and a thermally deformable element disposed in said region along one side of the centerline of said nozzle in an interacting relationship with said stream for affecting the pressure of said fluid in and apportioning said fluid between said two passages as a function of temperature sensed by said deformable means.

12. The device of claim 11 wherein said thermally deformable element comprises an element selected from the group consisting of a bimetallic strip the metallic components of which have different thermal expansion coefficients, and a bourdon tube.

13. The device according to claim 11 further comprising a second thermally deformable element disposed in said region along the other side of said centerline for apportioning said stream in conjunction with said first element.

14. The device of claim 13 wherein said second thermally deformable element comprises an element selected from the group consisting of a bimetallic strip the metallic components of which have different thermal expansion coefficients, and a bourdon tube.

15. A temperature sensitive fluidic device comprising:

a power nozzle for issuing a stream of fluid into an interaction region;

two outlet passages located downstream of said region for receiving said stream;

a wedge-shaped flow divider located downstream of said region, the apex of said divider being on the centerline of said nozzle, said two fluid outlet passages being along either side of said divider; and a thermally deformable element attached at one end thereof to said apex and projecting into said region substantially along the centerline of said nozzle when said element is at a predetermined temperature, said element being disposed in an interacting relationship with said stream for affecting the pressure of said fluid in said passage as a function of temperature sensed by said deformable means.

16. The device of claim 15 wherein said thermally deformable element comprises an element selected from the group consisting of a bimetallic strip the metallic components of which have different thermal expansion coefficients, and a bourdon tube.

17. A temperature sensitive fluidic device comprising:

a power nozzle for issuing a stream of fluid into an interaction region;

at least one outlet passage located downstream of said region for receiving said stream;

a mechanically flexible strip disposed in said region for deflecting said stream; and thermally deformable means remotely located and operatively associated with said strip for affecting the pressure of said fluid in said passage by means of said strip as a function of temperature sensed by said deformable means.

18. The device of claim 17 wherein said thermally deformable means comprises at least one element selected from the group consisting of a bimetallic strip the metallic components of which have different thermal expansion coefficients, and a bourdon tube.